UNITED STATES PATENT OFFICE.

GEORGE B. TWITCHELL, OF CINCINNATI, OHIO.

CASING FOR SAUSAGES AND PROCESS OF PREPARING.

1,225,530.  Specification of Letters Patent.  Patented May 8, 1917.

No Drawing.  Application filed April 26, 1915.  Serial No. 24,102.

*To all whom it may concern:*

Be it known that I, GEORGE B. TWITCHELL, a citizen of the United States, residing at Cincinnati, in the county of Hamilton and State of Ohio, have invented a new and useful Improvement in Casings for Sausages and Processes of Preparing, of which the following specification is a full disclosure.

My invention relates to a process of producing sausage casings, and the resultant product.

The guts available for casings in this country, notably lamb guts, are too fragile to be properly cleaned, so that imported casings are in general use, at constantly increasing prices, and such casings are made abroad under uncertain sanitary conditions.

There is therefore a great need of some suitable process enabling the treatment of domestic guts for casings of the requisite strength and purity. To this end, it is the object of my invention to provide a simple, wholesome and economical process for treating the domestic material to strengthen the tissue without impairment of the elasticity, or color of the product, and to use non-injurious treatment materials, which can be used under the sanitary regulations pertaining to food products, and under conditions of operation enabling the thorough inspection of the preparation from raw material to finished product.

As the casings themselves are a food product, I preferably select food products for the treatment solutions, and have discovered an entirely efficient and practical process involving only two steps at the most.

The fresh material, say lamb gut, is soaked in a warm solution of casein for about an hour, or until thoroughly saturated, the result being that the tissue becomes impregnated with the treatment solution. The stock is removed and the excess solution is permitted to drip. The guts are then subjected to the action of a salt solution, the function of which step is to fix the casein component. The effect of this second step appears to be that the casein is thrown out of its solution held within the interstices of the tissue so as to become structurally incorporated therewith. The guts can then be turned inside out and the lining material cleaned off in the usual way, scraping by hand or machine, the outer gut membrane being sufficiently toughened by the casein to permit of this separation, leaving the reinforced membrane or casing. The casings so prepared are of requisite strength, having apparently increased elasticity, and being of a desirable whitish color, transparent when stretched, as when the sausage meat is incased. I have obtained the best results from a solution of casein in aqueous hydrochloric acid, say 1-1000 or even as strong as one part acid to 800 parts water, although the solution composition is not to be regarded as a limitation of this invention.

The advantage of using a solution of a food product for the reinforcing component is readily apparent, as the resultant product is not only pure and wholesome, but the process is entirely sanitary and open to inspection.

The first treatment step being before the gut is turned, it is the outer layer which takes up the casein, and in which the casein becomes fixed in the second step, the resultant increment of strength not only enabling the casing to withstand the scraping, but the toughness thus imparted to the casing enabling a cleaner and readier separation of the relative soft gut-lining tissue which should be as nearly as possible eliminated.

Having thus described my invention, I claim as new and desire to secure by Letters Patent of the United States:—

1. The herein described process of preparing gut sausage casings, which consists in incorporating into the membraneous tissue a non-deleterious material having the property of structurally strengthening the same without impairing the elasticity.

2. The herein described process of preparing gut sausage casings, which consists in incorporating into the membraneous tissue a food product having the property of structurally strengthening the same without impairing the elasticity.

3. The herein described process of preparing gut sausage casings, which consists in incorporating into the membraneous tissue a casein having the property of structurally strengthening the same without impairing the elasticity.

4. The herein described process of preparing gut sausage casings which consists in soaking the gut in a solution of casein.

5. The herein described process of preparing gut sausage casings which consists in soaking the gut in a solution of casein and then fixing the casein in the tissue.

6. The herein described process of preparing gut sausage casings which consists in first treating them with a casein solution and then with a saline fixing solution.

7. A gut casing for sausages having a food product incorporated in the tissue.

8. A gut casing for sausages having casein incorporated in the tissue.

In witness whereof, I hereunto subscribe my name.

GEORGE B. TWITCHELL.